Patented Feb. 9, 1937

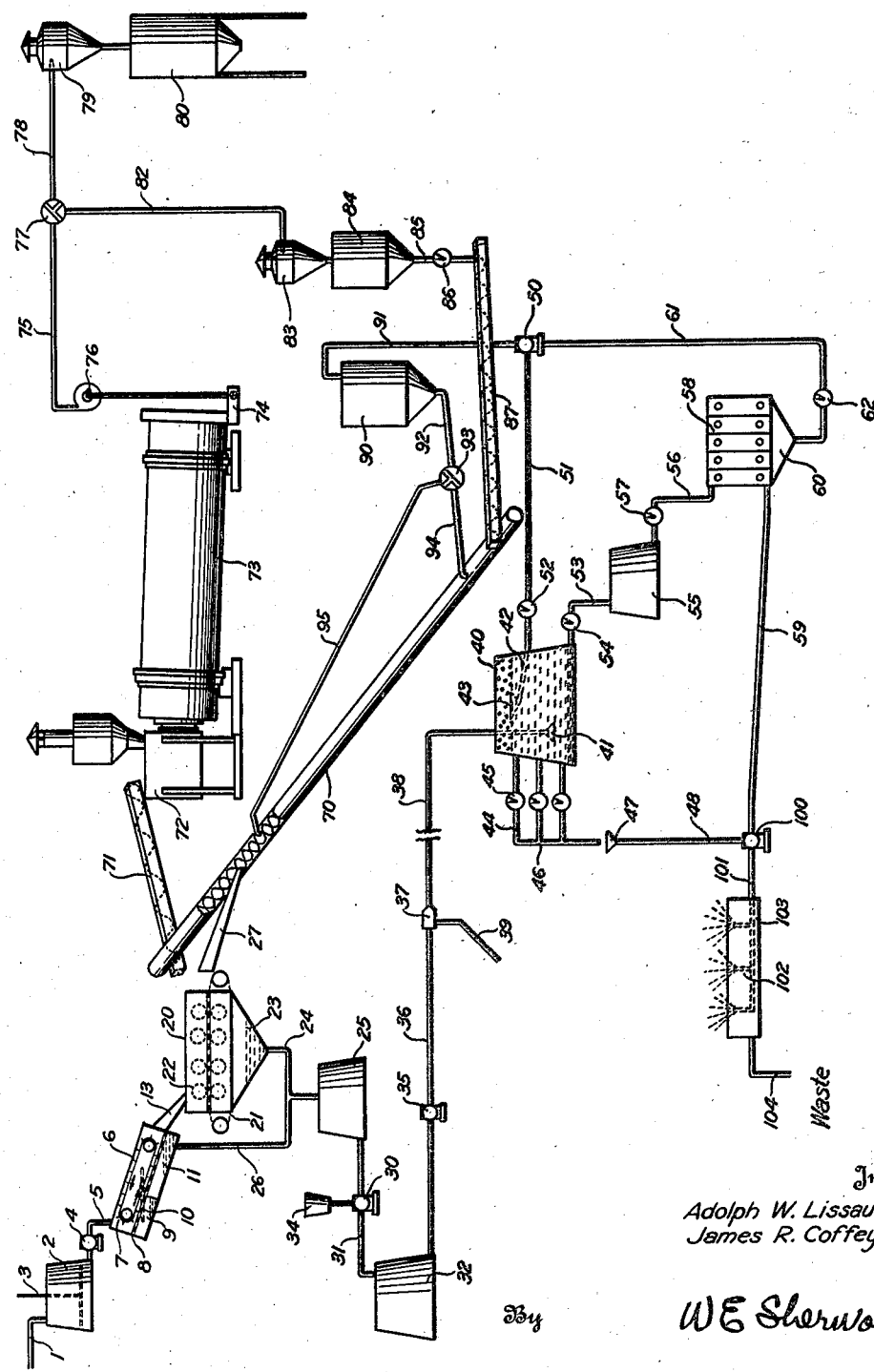

2,070,286

UNITED STATES PATENT OFFICE 2,070,286

METHOD OF TREATING DISTILLERY SLOP

Adolph W. Lissauer and James R. Coffey, Louisville, Ky., assignors, by mesne assignments, to Louisville Drying Machinery Company, Incorporated, Louisville, Ky., a corporation of Kentucky Application August 3, 1935, Serial No. 34,549

15 Claims. (Cl. 99—5)

This invention relates to an improved method of treating distillery slop for the purpose of recovering the grain contained therein and utilizing such grain as a feed substance. In our copending applications, Serial No. 747,712 and Serial No. 748,505, we have disclosed various methods of treating thick distillery slop and thin distillery slop for the purpose of recovering the suspended grain elements contained therein. Such methods have proven satisfactory in practice and have constituted a remarkable advance over the prior art in that they have enabled the distiller to recover a much higher percentage of salvaged grain per bushel of grain mashed in the still and at the same time be assured of a waste product which will not putrefy. However, despite these marked advantages such processes have been subject to the fault that they require a relatively long period of time to achieve these results. The present invention, therefore, teaches a method which while assuring these desirable results also assures a much more rapid and efficient recovery of the grain.

Raw distillery slop comprises a large amount of insoluble grain elements held in a state of suspension and a smaller amount containing albumens and albuminoids held in a state of solution. The presence of the soluble elements causes the greater part of the insoluble suspended elements to assume a state of colloidal suspension. Since these small suspended elements do not readily lend themselves to the usual mechanical filtering processes, it is necessary to free them from the colloidal suspensions in order to separate them from the slop. In the past various attempts have been made to coagulate these suspensions by the admixture of an alkaline agent with the slop. By so doing a somewhat greater proportion of the suspended solids have been recovered, but by far the greater portion has still remained in suspension and escaped through the filters and presses into the waste outlet. As one illustration of our experiments with this characteristic of the slop we have found that due to its lactic acid content the average raw slop has a hydrogen-ion concentration of approximately 4 pH. In order to free the small grain elements from this slop two distinct and mutually necessary conditions must obtain.

Firstly, the pH of the slop must be changed to a working range near its isoelectric point which in the case of a Bourbon slop is beween 6.5 pH and 9 pH. When the pH of such slop is within these limits the admixture of a proper precipitation agent will cause an efficient and rapid separation of the small suspended elements from the colloidal suspensions in which they have been held.

Secondly, after the slop has been placed in a proper condition for treatment an agent having the characteristic of causing precipitation, better known as oxidation potential, must be added to the same. When this is done all of the soluble proteids are coagulated and the small suspended grain elements, then having nothing to hold them in colloidal suspension, precipitate of their own accord.

Consequently, it is apparent that this process involves two critical factors both of which must be present before a complete precipitation can take place. It is found that chlorine is best suited as a precipitation agent since it has a relatively high oxidation potential and is relatively inexpensive. Chlorine may be used in its gaseous or liquid form or may be introduced in the form of a solution. The primary advantage of using chlorine alone resides in the fact that no additional solids will appear in the final products. Other precipitation agents may be used in this process should occasion demand. These agents may be classified as chlorine-liberating compounds such as calcium hypochlorite, sodium hypochlorite, potassium hypochlorite and bleaching powder. Upon mixing with the liquid slop these agents form hypochlorous acid which readily disassociates to form chlorine, oxygen and hydrochloric acid. These in turn cause the precipitation of the suspended grain elements heretofore mentioned. It is also found that alkaline agents such as trisodium phosphate, soda ash and the like are well suited to bring the pH concentration of the slop within the working range near the isoelectric point. Experiments have shown that unless the pH of the slop is within this range the desired complete precipitation cannot take place regardless of the amount of chlorine used. Conversely, unless an agent having a high oxidation potential is used, the desired complete precipitation cannot take place regardless of the value of the pH even if it corresponds to the isoelectric point of the slop.

In applying this discovery to actual use in distilleries we have found that the rapidity with which the grain elements are recovered from the slop depends upon several factors. The specific gravity of these grains which have been mashed and have passed through the stills is by no means uniform. The small pieces of husks and bran are usually heavy enough to settle to the bottom of the reaction vats in a short time, but the lighter flaky particles of the grain require an unusually long period of time to precipitate of their own accord. The reaction of the various agents in the slop, moreover, involves the generation of gases such as $CO_2$ for a period of time and this gas rising to the surface of the slop carries with it and holds on the surface those lighter particles just mentioned. In order to provide a relatively rapid and efficient recovery of the grain we have found that a process involving removal of such light grain particles, decantation of the liquid and removal of the precipitate will give the desired result.

This invention, therefore, has as an object the teaching of a rapid and efficient method of recovering substantially all of the grain elements from a distillery slop.

Another object is the teaching of a method for changing the isoelectric point of a slop and then precipitating the suspended solids from such slop.

A further object is the teaching of a method of producing a dry feed substance from the grain elements found in a slop.

Another object is the production of a superior feed substance from distillery slop and the production of a more desirable waste product from such slop.

Other objects and advantages of the invention will be made apparent from the following disclosure of the same when considered in connection with the drawing, in which:

The accompanying diagrammatic view illustrates one form of installation suitable for carrying out the invention.

An inlet pipe 1 conveys the hot, thick slop from the distillery to a vat 2 in which a slowly revolving agitating means 3 is placed for the purpose of preventing a premature settling of the heavy grain particles. A suitable pump means 4 moves the heavy slop through pipe 5 into the upper portion of a filtering means 6. This filtering means is preferably of that type which insures a thorough refiltering of the filtrate such as disclosed in the United States patent to J. Credo, 1,669,973. In this filter a large portion of the solids in suspension are mechanically separated from the thick slop and are conveyed from filter 6 through chute 13 into a press 20. The filter comprises a moving conveyor element 7, driven by any suitable means, which conveyor carrys the slop along a screen 8 through which the liquid filtrate may pass into an upper compartment 9. From this compartment the liquid may drain through a by-pass 10, refilter through the separated solids and then be collected in a lower compartment 11.

The separated solids entering press 20 fall upon a moving screen 21, driven by any suitable means, and are carried between rolls 22 which serve to press out any liquid held by these wet solids. This liquid falls into the lower part 23 of the press whence it is conveyed by pipe 24 into a vat 25. Likewise, the thin slop resulting from the filtering step is conveyed by pipe 26 into vat 25 and mixes with the thin slop coming from press 20. The separated solids passing through press 20 fall into a chute 27 leading to a heavy mixing conveyor the purpose of which will later become apparent.

The hot thin slop collected in vat 25 is withdrawn therefrom by a metering pump 30 of any suitable construction and is moved through pipe 31 into a reaction vat 32. Connected to metering pump 30 is a hopper 34 containing an alkaline agent of the nature hereinbefore described. By this arrangement the alkaline agent is intimately mixed with the thin slop in the exact proportion required to bring the pH value of the slop to within the working range near its isoelectric point. This mixture is retained in reaction vat 32 sufficiently long to assure the establishment of a pH value approximating the isoelectric point of the slop whereby further treatment will result in a proper coagulation of the colloidal suspensions of soluble grain elements. At the expiration of this time a pump 35 withdraws the treated thin slop from the reaction vat and moves it through pipe 36 and injector 37 into a long pipe 38 leading into the separation vat 40. Connecting with injector 37 is a pipe 39 through which the precipitation agent, such as gaseous or liquid chlorine or any of the chlorine-liberating compounds heretofore mentioned, is introduced and mixed with the treated thin slop which now has a pH value within the desired working range. It is contemplated that other mixing apparatus may be used in lieu of the injector 37 when such use becomes more desirable. We have found that in passing through the long pipe 38 the treated thin slop is thoroughly mixed with the precipitation agent and that it soon reaches a condition wherein substantially all of the suspended solids can be separated from the slop in a remarkably short period of time.

In order to carry out this separation in an efficient and rapid manner the pipe 38 leads into the vat 40 a substantial distance and terminates in a flared open end 41. By virtue of the treatment which it has undergone the slop emerging from 41 at once begins to divide into separate and distinct portions. The heavier particles of the grain at once precipitate from the slop and settle to the bottom of the vat.

Due to the reactions taking place between the alkaline agent, precipitation agent and the hot slop, various gases including $CO_2$, are liberated and rise to the top of the open vat 40 whence they escape. In so doing they carry to the surface of the slop a large portion of the light, flaky grain particles which form a frothy cap or grain resting on the surface of the liquid. It is significant to note that a relatively small amount of liquid is held by these light particles. Consequently, in the subsequent treatment of these particles a smaller load is placed upon the dryer and a more efficient process of recovery ensues.

In order to remove the cap of light particles from the slop a floating pipe 42 terminating in a flared open end 43 is pivoted to the side of vat 40. The open end 43 of the pipe floats upon the surface of the heavier liquid of the slop and by means of a pump 50 connected to the pipe 42 through a pipe 51 and a valve 52, the cap of light grain particles may be removed from vat 40 without disturbing the liquid or heavy precipitate in the same vat.

Due to the liberation of the suspended grain elements from the colloidal suspensions in which they had been held in the slop, a clear liquid appears in vat 40 above the layer of precipitate on the bottom of the vat and below the cap of light particles at the top of the vat. This liquid comprises essentially an alkaline solution which has also been subjected to a chlorinating and oxidizing action by the hypochlorous acid resulting from the treatment with the precipitation agent. It is substantially free of suspended grain particles and has a remarkably low B. O. D. in comparison with the waste liquid resulting from former processes of treating distillery slop.

In order to decant this waste liquid from the separation vat a plurality of pipes 44 having valves 45 therein and leading into a header 46 is provided. For convenience, header 46 terminates above an open funnel 47 leading into pipe 48. By this arrangement the color and condition of the waste liquid may be observed during the decantation process in order to avoid drawing off as waste any of the cap of light particles or the residue of heavy precipitate.

The heavy precipitate may be taken from vat 40 by any suitable means, such as a pipe 53 leading from vat 40 to a storage vat 55 and controlled by a valve 54. From the storage vat the precipitate may be led by pipe 56 through a valve 57 into a press 58 of any suitable construction such as a conventional filter press.

In press 58 the major portion of the liquid held by the precipitate is removed and passes off as waste through a pipe 59. The residue of the precipitate in the form of a heavy sludge drops into the bottom 60 of the press whence it is moved by pump 50 through a pipe 61 controlled by valve 62.

It has been found that the above process of removing the various parts of the treated thin slop may be varied in accordance with existing conditions and still give the desired result. For example, a plurality of separation vats 40 may be connected in parallel to pipe 38 depending upon the quantity of slop being handled. Moreover, the withdrawal of the cap of light particles, the liquid and the precipitate may take place simultaneously or in sequence with equally good results.

In utilizing the grains recovered by the process disclosed above a heavy mixing conveyor 70 is provided. The heavy solids mechanically separated from the slop enters conveyor 70 through chute 27 and are carried forward to a point where they fall into a smaller conveyor 71 leading into a hopper 72 at the inlet of dryer 73. In passing through the dryer these solids are thoroughly dried and emerge in a header 74 at the other end of the dryer in the form of a dry, granular substance. Any chlorine which may be held by the light grain particles or the heavy sludge during their passage through this dryer, as hereinafter described, will be driven off in the form of a gas and will escape from the dryer exhaust. From header 74 these dried grains are conveyed through pipe 75 by the action of a blower 76 and are moved to a regulating means 77, which for convenience is shown as a three way valve. From this valve one pipe 78 leads to a separator 79 from which the finished material may pass into a storage bin 80 forming the outlet for the useful by-product from the plant.

A second pipe 82 connects with the valve 77 and leads into a second separator 83 which in turn communicates with a storage bin 84 in which the dried solids may be stored. A pipe 85 controlled by valve 86 is adapted to lead the dried solids from bin 84 into a conveyor 87 which communicates with mixing conveyor 70 adjacent the lower end of the same. The dried solids thus used will be mixed with the sludge and light grain particles for the purpose of introducing these latter into the conveyor. By this arrangement a means is provided for moving the wet heavy sludge and damp light grain particles into the dryer with a minimum of difficulty. Moreover, by first mixing a portion of dried grain with the wet sludge, the regulation of the process and the efficiency of drying is improved.

The damp grain particles removed from vat 40 and the heavy wet sludge emerging from press 58 may be stored separately or jointly in tank 90 and conveyed to dryer 73 in any convenient manner. As shown, a pump 50 is provided to move either or both of these products through pipes 51 and 61 controlled by valves 52 and 62 into a pipe 91 leading into storage tank 90.

From tank 90 the contents may pass through pipe 92 controlled by a regulating means 93, which for convenience is shown as a three way valve, into either or both of pipes 94 and 95. These pipes enter the mixing conveyor adjacent the entrance of the dried product and adjacent the entrance of the separated wet solids.

By virtue of this arrangement it is possible for the operator to dry the separated heavy solids, the light grain solids or the heavy precipitate either singly or in any desired joint proportions. Since the protein content of these various recovered grain elements are not the same, it follows that a final product may thus be obtained having any desired protein percentage.

As explained heretofore, the waste liquid resulting from this process has a relatively low B. O. D. and may be drained directly into water courses without creating a nuisance. In order, however, to prevent any possibility of this waste liquid having too high a B. O. D. for local health regulations we provide an additional aerating step. The pump 100 which draws off the waste liquid from pipes 48 and 59 moves this liquid into a pipe 101 terminating in spray nozzles 102 contained in an aerating tank or tower 103 of any suitable construction. In this way the waste liquid is brought into intimate contact with the air and is oxidized to whatever extent is deemed necessary. A final drain pipe 104 is then provided for leading the waste liquid to the disposal point.

Having thus disclosed the invention it is obvious that variations of the same may be employed without departing from the scope of such invention and it is our intention to cover by the appended claims such changes as may reasonably be included within the scope thereof.

We claim:

1. The improvement in the art of treating distillery slop comprising, separating the large suspended solids from the thick slop, mixing an alkaline agent with the resulting thin slop and raising the pH value of the thin slop to approximately its isoelectric point, mixing a hypochlorous precipitation agent with the treated thin slop and changing the phase of the colloidal suspensions therein to free the smaller suspended grain elements, removing from the surface of the thin slop the lighter grain elements floating therein, draining off as waste the liquid from the thin slop, removing the heavy precipitate from the thin slop and drying the separated solids, light grain elements and heavy precipitate to form a feed substance.

2. The method of treating distillery slop comprising, separating the large suspended solids from the thick slop, mixing an alkaline agent with the resulting thin slop and raising the pH value of the slop to approximately its isoelectric point, mixing a chlorine-liberating precipitation agent with the treated thin slop to coagulate the colloidal suspensions in the slop and to free the small suspended grain elements from the colloidal suspensions, withdrawing the light grain elements floating on the surface of the slop and drying said light grain elements to form a feed substance.

3. The method of treating distillery slop comprising, separating the large suspended solids from the slop, mixing an alkaline agent with the resulting thin slop and raising its pH value to approximately its isoelectric point, mixing a chlorine-liberating precipitation agent with the treated thin slop to coagulate the colloidal suspensions in the slop and to free the small suspended grain elements from the colloidal suspensions, removing the light grain elements floating on the thin slop, draining off as waste the liquid from the thin slop, removing the heavy precipitate from the thin slop, drying the separated solids, mixing the light grain elements and the precipitate with the dried solids and drying the mixture to form a feed substance.

4. In the treatment of distillery slop, the method of recovering small suspended grain elements therefrom comprising, mixing with the slop an alkaline agent and raising the pH value of the slop to approximately its isoelectric point, mixing with the treated slop a chlorine-liberating precipitation agent to change the phase of the colloidal suspensions therein and to free the small suspended grain elements, removing the liquid from the slop as waste and utilizing the light grain elements floating on the slop and the heavy precipitate formed in the slop as a feed substance.

5. In the treatment of distillery slop, the method of recovering small suspended grain elements therefrom comprising, mixing with the slop an alkaline agent to raise the pH value of the slop to within a range of 6.5 pH to 9 pH, mixing with the treated slop a hypochlorous precipitation agent to change the phase of the colloidal suspensions therein and to free the small suspended grain elements, removing the light grain elements floating on the slop, draining off as waste the liquid from the slop, and mixing the heavy precipitate from the slop with the light grain elements to form a feed substance.

6. In the treatment of distillery slop, the method of recovering small suspended grain elements therefrom comprising, mixing an alkaline agent with the slop to raise the pH value of the slop to within a range of 6.5 pH to 9 pH, mixing a chlorine-liberating precipitation agent with the treated slop to change the phase of the colloidal suspensions therein and to free the small suspended grain elements, generating a gas in the reaction of the said agents with the slop, raising a portion of the light grain elements to the surface of the slop by means of the generated gas, removing the light grain elements floating on the surface of the slop and drying said elements to form a feed substance.

7. In the treatment of distillery slop, the method of recovering the small suspended grain elements therefrom comprising, mixing an alkaline agent with the slop and raising its pH value to approximately its isoelectric point, mixing a chlorine-liberating precipitation agent with the treated slop to change the phase of the colloidal suspensions therein and to free the small suspended grain elements, generating a gas in the reaction of said agents with the slop, raising a portion of the grain elements to the surface of the slop by means of the generated gas, precipitating a portion of the grain elements to the bottom of the slop, removing the grain elements floating on the surface of the slop, draining off the liquid from the slop as waste and utilizing the removed grain elements and the precipitate to form a feed substance.

8. In the treatment of distillery slop, the method of recovering grain elements therefrom comprising, mixing soda ash with the raw slop and adjusting the pH value of the slop to a value approximating the isoelectric point of the slop, mixing chlorine with the so-treated slop and coagulating the colloidal suspensions of the slop, liberating the suspended grain elements of the slop and utilizing the liberated grain elements to form a feed substance.

9. In the treatment of distillery slop, the method of recovering grain elements therefrom comprising, mixing trisodium phosphate with the raw slop and adjusting the pH value of the slop to a value approximating the isoelectric point of the slop, mixing chlorine with the so-treated slop, and coagulating the colloidal suspensions of the slop, liberating the suspended grain elements of the slop and utilizing the liberated grain elements to form a feed substance.

10. In the treatment of distillery slop, the method of recovering grain elements therefrom comprising, mixing soda ash with the raw slop and adjusting the pH value of the slop to a value approximating the isoelectric point of the slop, mixing a chlorine-liberating hypochlorite with the so-treated slop and coagulating the colloidal suspensions of the slop, liberating the suspended grain elements of the slop and utilizing the liberated grain elements to form a feed substance.

11. In the treatment of distillery slop, the method of recovering grain elements therefrom comprising, mixing trisodium phosphate with the raw slop and adjusting the pH value of the slop to a value approximating the isoelectric point of the slop, mixing a chlorine-liberating hypochlorite with the so-treated slop and coagulating the colloidal suspensions of the slop, liberating the suspended grain elements of the slop and utilizing the liberated grain elements to form a feed substance.

12. In the treatment of distillery slop, the method of recovering grain elements therefrom comprising, mixing soda ash with the raw slop and adjusting the pH value of the slop to a value approximating the isoelectric point of the slop, mixing bleaching powder with the so-treated slop and coagulating the colloidal suspensions of the slop, liberating the suspended grain elements of the slop and utilizing the liberated grain elements to form a feed substance.

13. In the treatment of distillery slop, the method of recovering grain elements therefrom comprising, mixing trisodium phosphate with the raw slop and adjusting the pH value of the slop to a value approximating the isoelectric point of the slop, mixing bleaching powder with the so-treated slop and coagulating the colloidal suspensions of the slop, liberating the suspended grain elements of the slop and utilizing the liberated grain elements to form a feed substance.

14. The process of treating distillery slop to eliminate putrefaction of its waste material comprising, mixing an alkaline agent with the raw slop and raising the pH value of the slop to within a range of 6.5 pH to 9 pH, mixing a chlorinating precipitation agent having a high oxidation potential with the so-treated slop and chlorinating the liquid in the slop, coagulating the colloidal suspensions in the slop by means of this agent, liberating the grain elements from the slop and removing substantially all of the grain elements therefrom, and draining off the chlorinated liquid as a sterile waste product.

15. The improvement in the art of treating distillery slop containing grain elements in a state of colloidal suspension comprising, changing the pH value of the slop to a value approximating the isoelectric point of the slop, coagulating the soluble grain elements by means of a chlorinating agent having a high oxidization potential, precipitating the grain elements from the state of suspension and removing the precipitated grain elements from the slop.

ADOLPH W. LISSAUER.
JAMES R. COFFEY.